(12) United States Patent
Yamamoto

(10) Patent No.: US 11,732,077 B2
(45) Date of Patent: Aug. 22, 2023

(54) RESIN COMPOSITION, ADHESIVE MEMBER, AND DISPLAY DEVICE

(71) Applicant: Samsung Display Co., Ltd., Yongin-si (KR)

(72) Inventor: Katsuhiro Yamamoto, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/371,341

(22) Filed: Jul. 9, 2021

(65) Prior Publication Data

US 2022/0144992 A1 May 12, 2022

(30) Foreign Application Priority Data

Nov. 9, 2020 (KR) ........................ 10-2020-0148902

(51) Int. Cl.
C08F 283/00 (2006.01)
C09J 151/08 (2006.01)

(52) U.S. Cl.
CPC ......... *C08F 283/008* (2013.01); *C09J 151/08* (2013.01)

(58) Field of Classification Search
None
See application file for complete search history.

(56) References Cited

U.S. PATENT DOCUMENTS

| 8,729,797 | B2 | 5/2014 | Lee et al. |
| 10,585,526 | B2 | 3/2020 | Kim et al. |
| 2007/0281235 | A1* | 12/2007 | Ono ................... G03G 9/08795 528/271 |
| 2008/0226916 | A1* | 9/2008 | Steeman ................ C09D 5/002 522/66 |
| 2009/0122234 | A1* | 5/2009 | Ito .............................. C08J 5/18 359/489.07 |
| 2014/0142210 | A1 | 5/2014 | Zhang et al. |

FOREIGN PATENT DOCUMENTS

| JP | 2012-237965 | 12/2012 |
| JP | 2016-129017 | 7/2016 |
| JP | 2017-210578 | 11/2017 |
| JP | 2019-65287 | 4/2019 |
| JP | 2019-218513 | 12/2019 |
| KR | 10-2012-0115842 | 10/2012 |
| KR | 10-2038160 | 10/2019 |
| KR | 10-2104663 | 4/2020 |
| KR | 10-2123686 | 6/2020 |

\* cited by examiner

*Primary Examiner* — Jeffrey D Washville
(74) *Attorney, Agent, or Firm* — Kile Park Reed & Houtteman PLLC

(57) ABSTRACT

A resin composition has a viscosity of equal to or less than about 20 mPa·s at a temperature in a range of about 30° C. to about 50° C. as measured according to JIS Z8803, a storage modulus in a range of about $1.7\times10^5$ Pa to about $3\times10^5$ Pa at about −20° C., and a storage modulus in a range of about $1.5\times10^4$ Pa to about $6\times10^4$ Pa at about 25° C. An adhesive member formed of the resin composition is also provided.

7 Claims, 10 Drawing Sheets

RESIN COMPOSITION, ADHESIVE MEMBER, AND DISPLAY DEVICE

CROSS-REFERENCE TO RELATED APPLICATION(S)

This application claims priority to and benefits of Korean Patent Application No. 10-2020-0148902 under 35 U.S.C. § 119, filed on Nov. 9, 2020 in the Korean Intellectual Property Office, the entire contents of which are incorporated herein by reference.

BACKGROUND

1. Technical Field

The disclosure relates to a display device including a resin composition, an adhesive member formed of the resin composition, and a display device including the adhesive member.

2. Description of the Related Art

Various display devices used for multimedia devices such as televisions, mobile phones, tablet computers, navigation systems, game machines are being developed. Recently, in order to facilitate portability and improve user convenience, display devices which are foldable, bendable, or rollable are being developed by providing the display devices with bendable and flexible display members.

Each of the members used in such a flexible display device is required to achieve reliability in a folding or bending operation. An adhesive resin used for forming an adhesive layer applied to display devices in various forms is required to have excellent coating properties for various types of display devices.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition having excellent coating properties.

The disclosure also provides an adhesive member having high adhesive strength and excellent bending resistance by curing the resin composition.

The disclosure also provides a display device including the adhesive member, thereby having excellent reliability in an operation such as folding.

An embodiment provides a resin composition which may have a viscosity equal to or less than about 20 mPa·s at a temperature in a range of about 30° C. to about 50° C., a storage modulus in a range of about $1.7 \times 10^5$ Pa to about $3 \times 10^5$ Pa at about −20° C., and a storage modulus in a range of about $1.5 \times 10^4$ Pa to about $6 \times 10^4$ Pa at about 25° C.

In an embodiment, a ratio of the storage modulus at about 25° C. to the storage modulus at about −20° C. may be in a range of about 0.05 to about 1.

In an embodiment, the resin composition may have a storage modulus in a range of about $1.5 \times 10^4$ Pa to about $6 \times 10^4$ Pa at about 60° C.

In an embodiment, a ratio of the storage modulus at about 60° C. to the storage modulus at about −20° C. may be in a range of about 0.05 to about 1.

In an embodiment, the resin composition may further include an organic solvent, and a content of the organic solvent may be less than about 0.5 wt % based on a total weight of the resin composition.

In an embodiment, the resin composition may further include a bifunctional (meth)acrylate monomer, and a content of the bifunctional (meth)acrylate monomer may be less than about 1 wt % based on a total weight of the resin composition.

In an embodiment, the resin composition may further include a (meth)acrylate monomer containing a hydroxy group.

In an embodiment, an adhesive member may include a polymer derived from a resin composition. The resin composition may have a viscosity equal to or less than about 20 mPa·s at a temperature in a range of about 30° C. to about 50° C., a storage modulus in a range of about $1.7 \times 10^5$ Pa to about $3 \times 10^5$ Pa at about −20° C., and a storage modulus in a range of about $1.5 \times 10^4$ Pa to about $6 \times 10^4$ Pa at about 25° C.

In an embodiment, the resin composition may have a storage modulus in a range of about $1.5 \times 10^4$ Pa to about $6 \times 10^4$ Pa at about 60° C.

In an embodiment, the adhesive member may have a 1800 peel strength equal to or greater than about 1 kg/25 mm.

In an embodiment, the resin composition may further include an organic solvent, and a content of the organic solvent may be less than about 0.5 wt % based on a total weight of the resin composition.

In an embodiment, the resin composition may further include a bifunctional (meth)acrylate monomer, and a content of the bifunctional (meth)acrylate monomer may be less than about 1 wt % based on a total weight of the resin composition.

In an embodiment, the resin composition may further include a (meth)acrylate monomer containing a hydroxy group.

In an embodiment, a display device may include a display panel, a window disposed on the display panel, and an adhesive member disposed between the display panel and the window. The adhesive member may be derived from a resin composition, and the resin composition may have a viscosity equal to or less than about 20 mPa·s at a temperature in a range of about 30° C. to about 50° C., a storage modulus in a range of about $1.7 \times 10^5$ Pa to about $3 \times 10^5$ Pa at about −20° C., a storage modulus in a range of about $1.5 \times 10^4$ Pa to about $6 \times 10^4$ Pa at about 25° C., and a storage modulus in a range of about $1.5 \times 10^4$ Pa to about $6 \times 10^4$ Pa at about 60° C.

In an embodiment, the resin composition may further include an organic solvent, and a content of the organic solvent may be less than about 0.5 wt % based on a total weight of the resin composition.

In an embodiment, a thickness of the adhesive member may be in a range of about 50 m to about 200 m.

In an embodiment, the display device may further include an input sensor, and the adhesive member may be disposed between the display panel and the input sensor or may be disposed between the input sensor and the window.

In an embodiment, the display panel may include a display element layer, and an encapsulation layer disposed on the display element layer. The input sensor may be directly disposed on the encapsulation layer, and adhesive member may be disposed on the input sensor.

In an embodiment, the display device may further include at least one folding region, and the at least one folding region may have a radius of curvature equal to or less than about 5 mm.

In an embodiment, the display device may further include a light control layer disposed between the adhesive member and the window, and an optical adhesive layer disposed between the light control layer and the window. The optical adhesive layer may include a polymer derived from the resin composition.

BRIEF DESCRIPTION OF THE DRAWINGS

The accompanying drawings are included to provide a further understanding of the embodiments and are incorporated in and constitute a part of the disclosure. The above and other aspects and features of the disclosure will become more apparent by describing in detail embodiments thereof with reference to the attached drawings, in which.

DETAILED DESCRIPTION OF THE EMBODIMENTS

Figure 1:
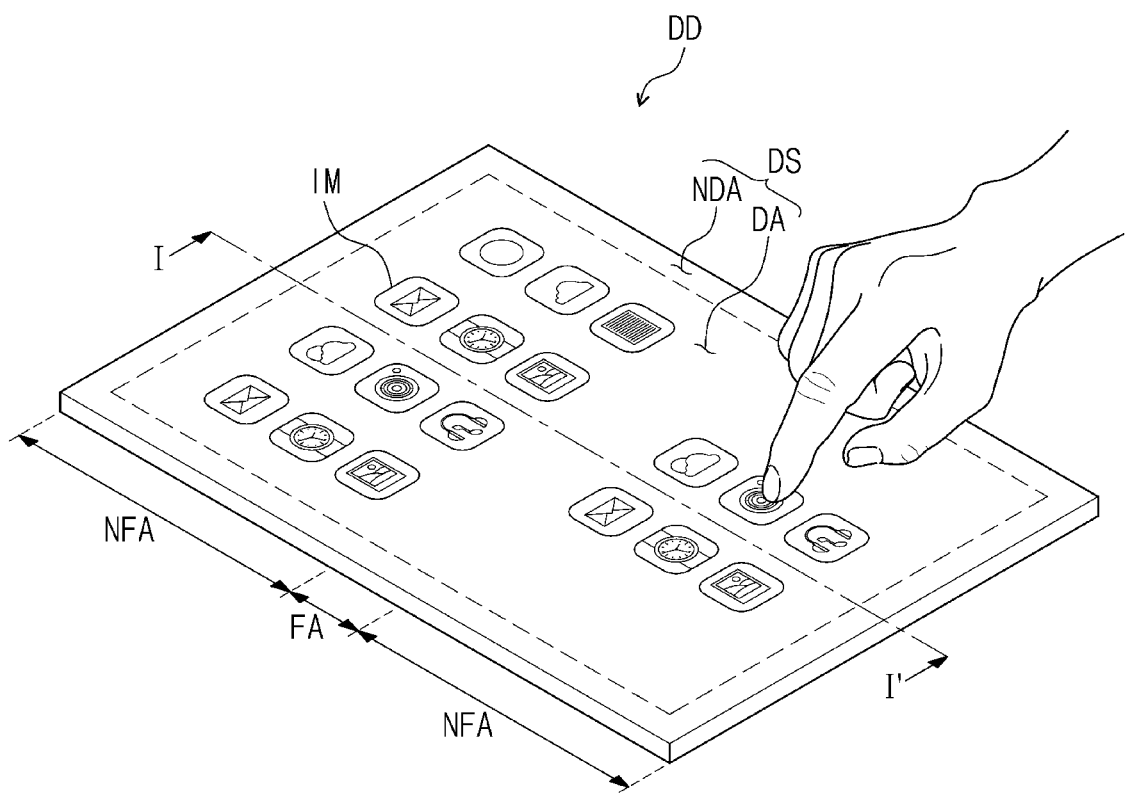
FIG. 1 is a perspective view of a display device according to an embodiment.
Figure 1:
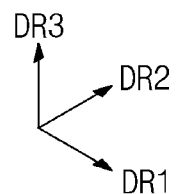

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like numbers refer to like elements throughout.

In the description, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the description, when an element is "directly on," "directly connected to," or "directly coupled to" another element, there are no intervening elements present. For example, "directly on" may mean that two layers or two elements are disposed without an additional element such as an adhesion element therebetween.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

The term "at least one of" is intended to include the meaning of "at least one selected from" for the purpose of its meaning and interpretation. For example, "at least one of A and B" may be understood to mean "A, B, or A and B." When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within +20%, 10%, or 5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a resin composition, an adhesive member, and a display device according to embodiments will be described with reference to the accompanying drawings.

Figure 2:
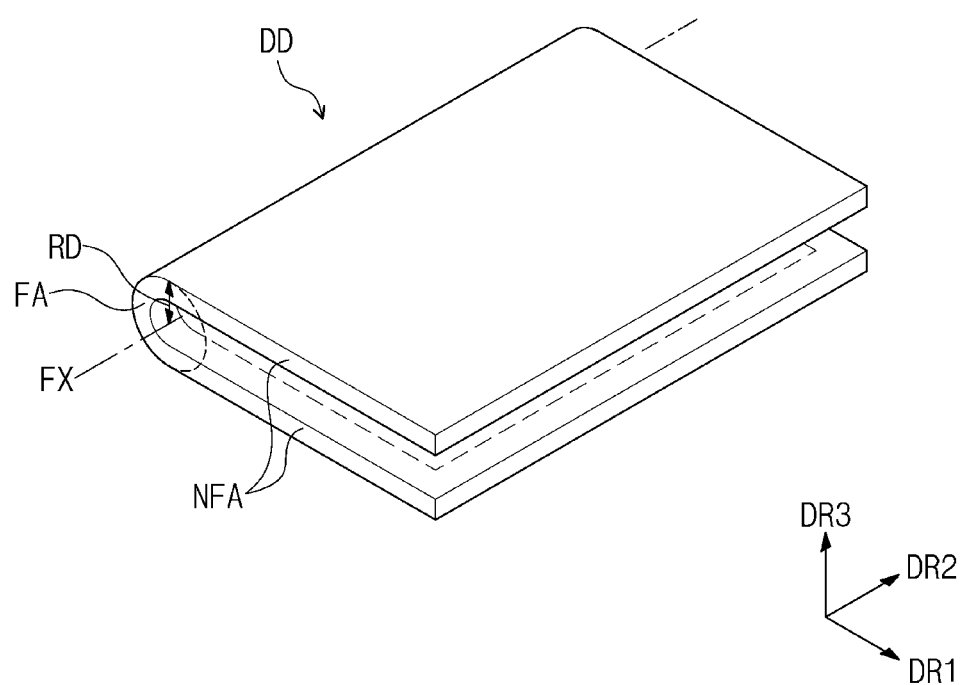
FIG. 2 is a perspective view illustrating the display device in FIG. 1 in a folded state.

FIG. 1 is a perspective view of a display device according to an embodiment. FIG. 2 is a perspective view illustrating the display device in FIG. 1 in a folded state.

Referring to FIG. 1, a display device DD of an embodiment may have a rectangular shape which has long sides extending in a first direction DR1 and short sides extending in a second direction DR2 which intersects the first direction DR1. However, embodiments are not limited thereto. The display device DD may have various shapes such as circular and polygonal shapes on a plane. The display device DD may be a flexible display device.

In the display device DD according to an embodiment, a display surface DS on which an image IM is displayed may be parallel to a plane defined by the first direction DR1 and the second direction DR2. A normal direction of the display surface DS, for example, a thickness direction of the display device DD may be indicated by a third direction DR3. A front surface (or an upper surface) and a back surface (or a lower surface) of each member are distinguished by the third direction DR3. However, directions indicated by the first to third directions DR1, DR2, and DR3 are a relative concept, and may be converted to different directions. Hereinafter, first to third directions are directions indicated by the first to third directions DR1, DR2, and DR3, respectively, and are given the same reference numerals.

The display device DD of an embodiment may include at least one folding region FA. Referring to FIG. 1 and FIG. 2, the display device DD may include the at least one folding region FA and non-folding regions NFA. The at least one folding region FA may be disposed between the non-folding regions NFA, and the at least one folding region FA and the non-folding regions NFA may be arranged adjacent to each other in the direction of the first direction DR1.

The folding region FA may be a portion deformable into a folded shape based on a folding axis FX extending in the direction of the second direction DR2. The at least one folding region FA may have a radius of curvature RD equal to or less than about 5 mm.

FIG. 1 and FIG. 2 each show one folding region FA and two non-folding regions NFA. However, the number of the folding region FA and the non-folding regions NFA is not limited thereto. For example, the display device DD may include more than two non-folding regions NFA and the at least one folding regions FA disposed between the non-folding regions NFA.

In the display device DD of an embodiment, the non-folding regions NFA may be disposed to be symmetrical to each other with respect to the folding region FA. However, embodiments are not limited thereto. The folding region FA may be disposed between the non-folding regions NFA, but the areas of two non-folding regions NFA facing each other with respect to the folding region FA may be different.

The display surface DS of the display device DD may include a display region DA and a non-display region NDA adjacent to the display region DA. The display region DA may display an image IM, and the non-display region NDA may not display an image IM. In an embodiment, the non-display region NDA may surround the display region DA, and may define the edge of the display device DD.

Referring to FIG. 2, the display device DD may be a foldable display device DD which is folded or unfolded. For example, the folding region FA may be bent based on the folding axis FX, which is parallel to the second direction DR2, so that the display device DD may be folded. The folding axis FX may be defined as a short axis which may be parallel to a short side of the display device DD.

When the display device DD is folded, the non-folding regions NFA may face each other, and the display device DD may be in-folded such that the display surface DS is not exposed to the outside. However, embodiments are not limited thereto. Different from what is illustrated in the drawing, the display device DD may be out-folded such that the display surface DS is exposed to the outside.

Figure 3:
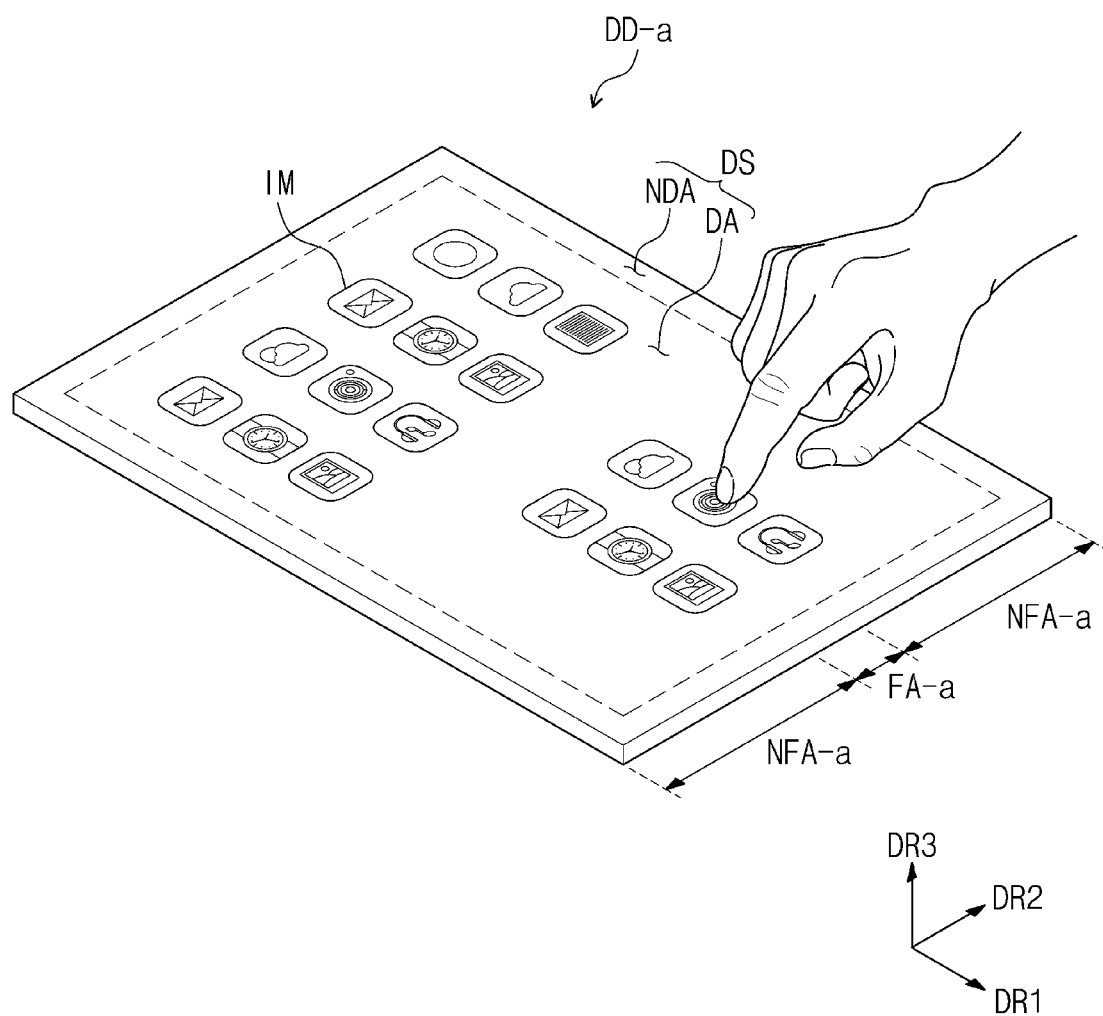
FIG. 3 is a perspective view of a display device according to an embodiment.
Figure 4:
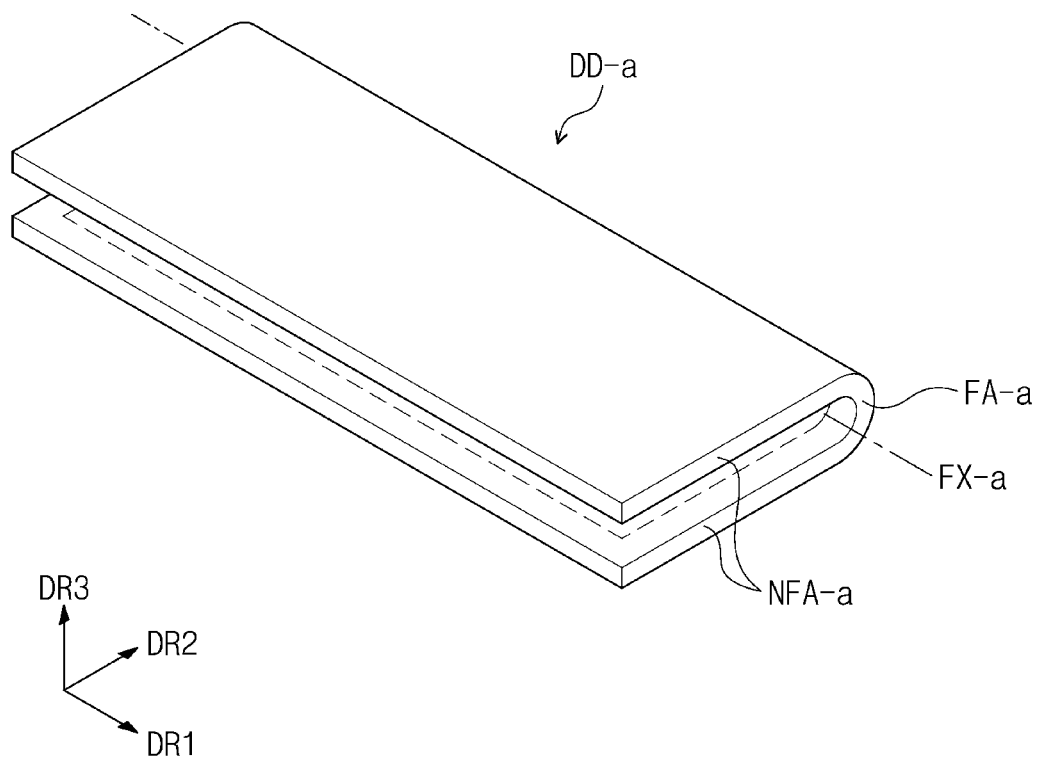
FIG. 4 is a perspective view illustrating the display device in FIG. 3 in a folded state.

FIG. 3 is a perspective view of a display device according to an embodiment. FIG. 4 is a perspective view illustrating the display device in FIG. 3 in a folded state.

Except for a folding operation, a display device DD-a illustrated in FIG. 3 may have substantially a same configuration as that of the display device DD illustrated in FIG. 1. Therefore, hereinafter, in the description of the display device DD-a illustrated in FIG. 3 and FIG. 4, the folding operation will be described.

Referring to FIG. 3 and FIG. 4, the display device DD-a may include a folding region FA-a and non-folding regions NFA-a. The folding region FA-a is disposed between the non-folding regions NFA-a, and the folding region FA-a and the non-folding regions NFA-a may be arranged adjacent to each other in the second direction DR2.

The folding region FA-a may be bent based on a folding axis FX-a which is parallel to the first direction axis DR1, so that the display device DD-a may be folded. The folding axis FX-a may be defined as a long axis which may be parallel to a long side of the display device DD-a. The display device DD illustrated in FIG. 1 may be folded based on a short axis, whereas the display device DD-a illustrated in FIG. 3 may be folded based on a long axis. In FIG. 4, the display device DD-a is illustrated as being in-folded such that a display surface DS is not exposed to the outside. However, embodiments are not limited thereto. For example, in another embodiment, the display device DD-a may be folded based on the long axis, and may be out-folded.

Figure 5:
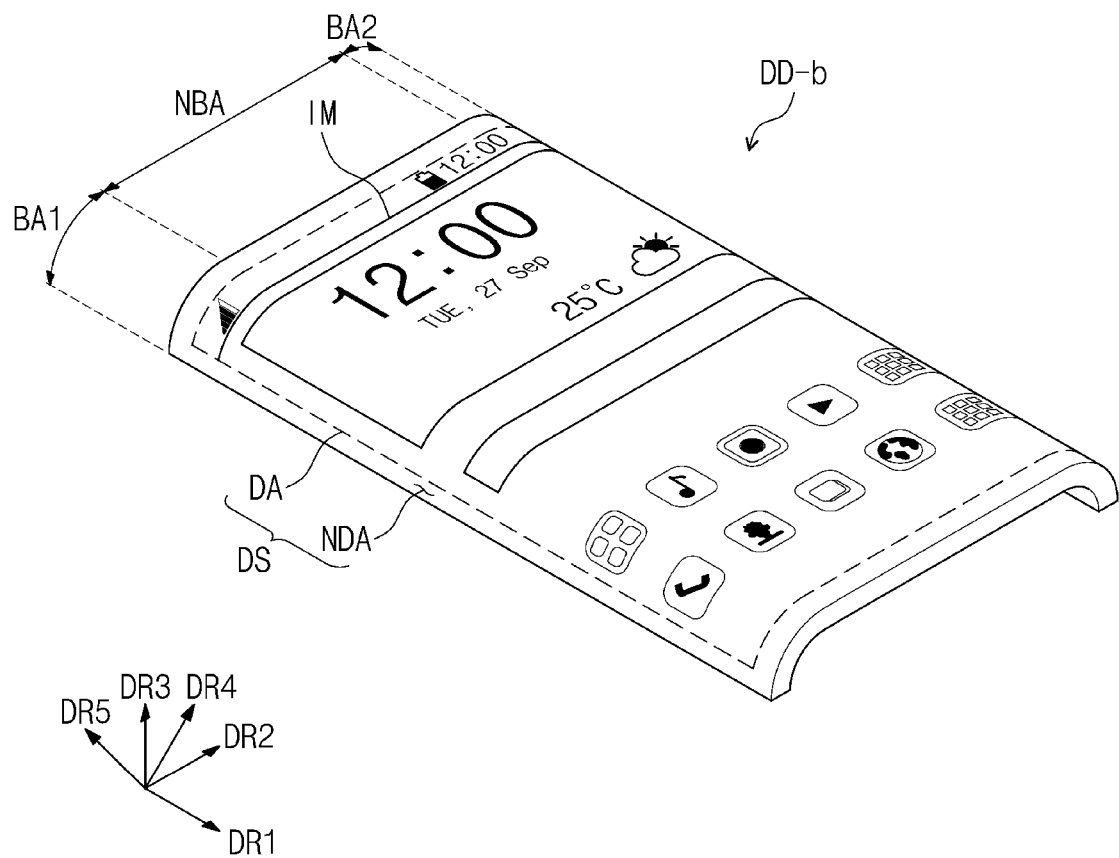
FIG. 5 is a perspective view of a display device according to an embodiment.

FIG. 5 is a perspective view of a display device according to an embodiment. A display device DD-b of an embodiment includes bending regions BA1 and BA2 and a non-bending region NBA, and the bending regions BA1 and BA2 may be bent from a side of the non-bending region NBA.

Referring to FIG. 5, the display device DD-b of an embodiment may include the non-bending region NBA in which the image IM is displayed on a front surface thereof, and a first bending region BA1 and a second bending region BA2 in which the image IM is displayed on side surfaces thereof. The first bending region BA1 and the second bending region BA2 may be bent from both sides of the non-bending region NBA, respectively.

Referring to FIG. 5, the non-bending region NBA may provide the image IM in the third direction DR3, which is the front surface of the display device DD-b, and the first bending region BA1 and the second bending region BA2 may provide an image in a fifth direction DR5 and in a fourth direction DR4, respectively. The fourth direction DR4 and the fifth direction DR5 may be directions intersecting the first to third directions DR1, DR2, and DR3. However, directions indicated by the first to fifth directions DR1 to DR5 are a relative concept, and are not limited to directional relationship illustrated in the drawings.

The display device DD-b of an embodiment may be a bending display device including the non-bending region NBA and the bending regions BA1 and BA2 respectively disposed on both sides of the non-bending region NBA. Although not illustrated, a display device of an embodiment may be a bending display device including one non-bending region and one bending region. For example, the bending region may be provided by being bent on only one side of the non-bending region.

In FIG. 1 to FIG. 5 described above, a foldable display device, a bending display device, and the like are illustrated and described. However, embodiments are not limited thereto. A display device of an embodiment may be a rollable display device, a flat rigid display device, or a bent rigid display device.

Hereinafter, in the description of a display device of an embodiment, the display device DD which is folded based on a short axis will be representatively described, but embodiments are not limited thereto. The following descriptions may be applied to various display devices other than the display device DD-a which is folded based on a long axis and the display device DD-b including a bending region.

Figure 6:
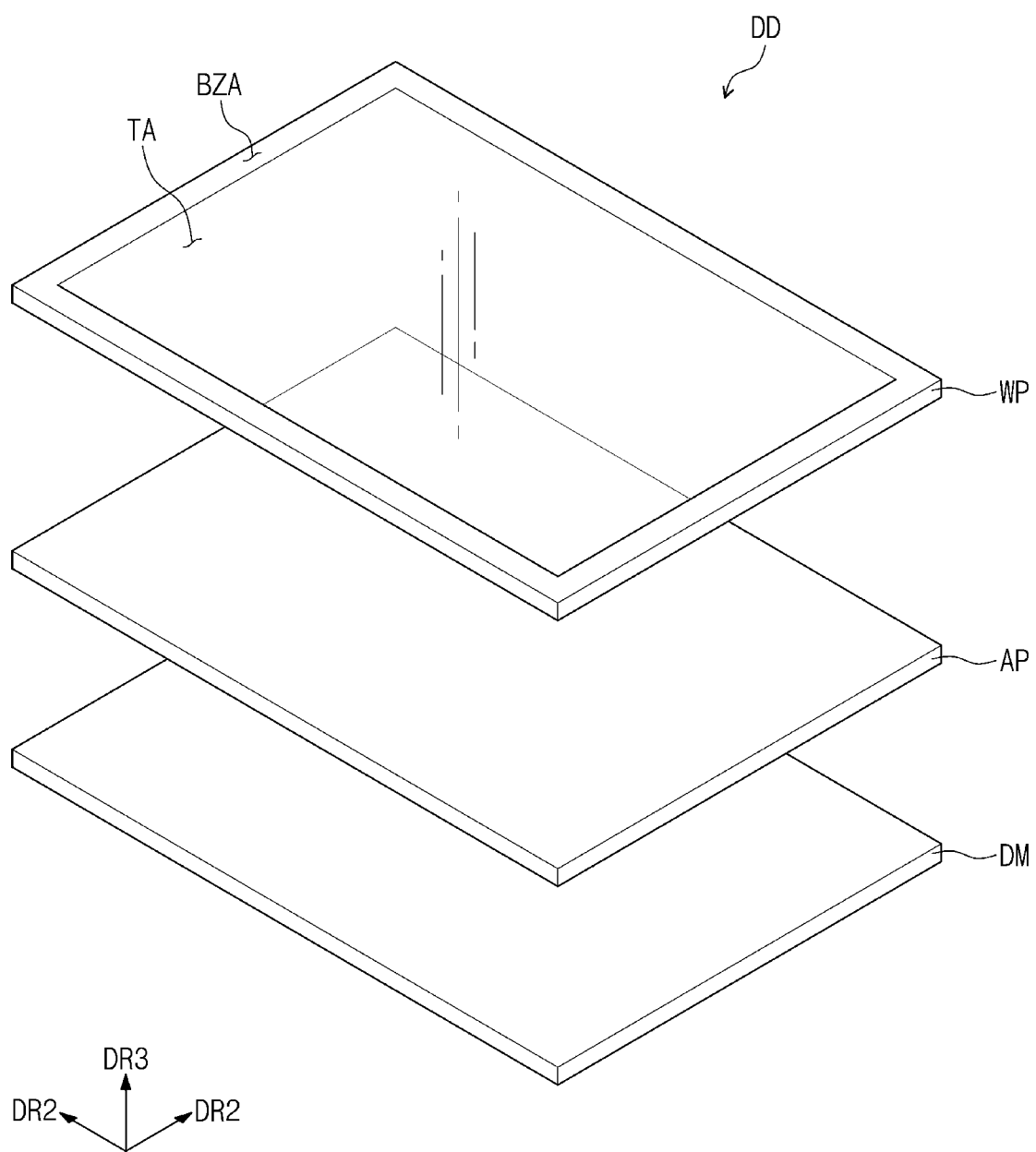
FIG. 6 is an exploded perspective view of a display device according to an embodiment.
Figure 7:
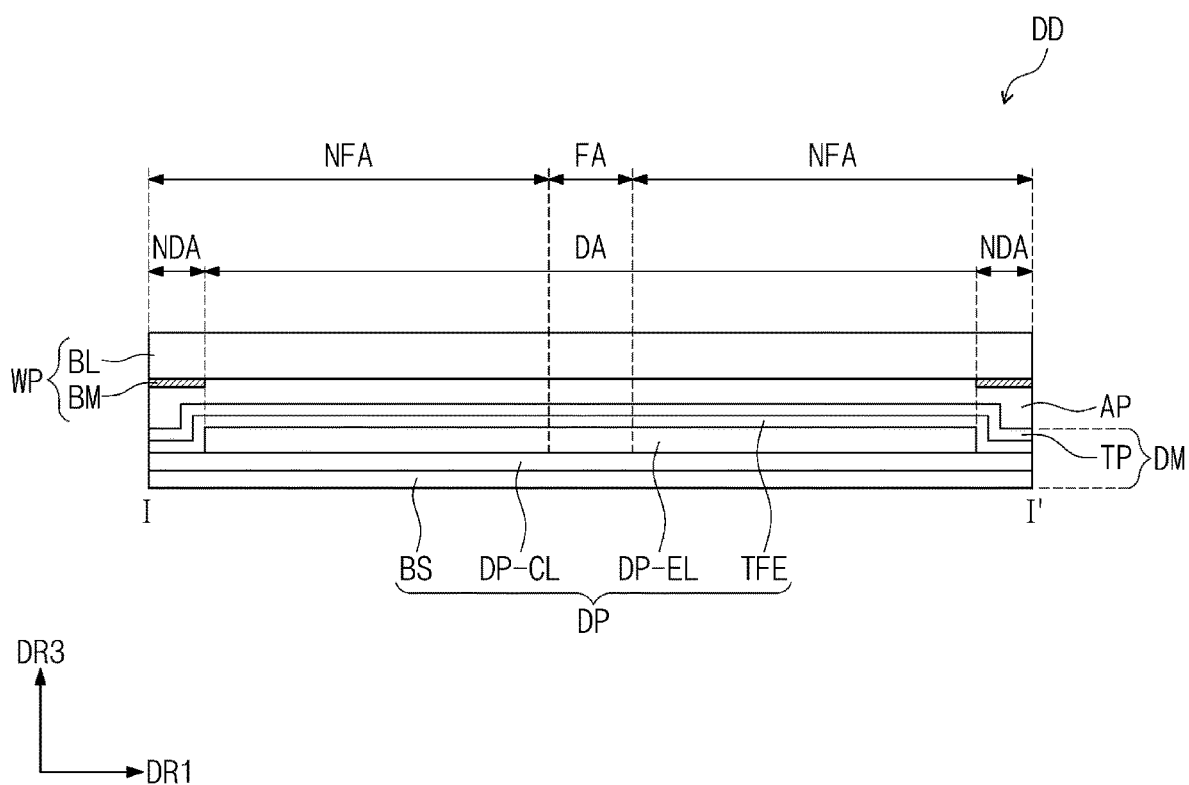
FIG. 7 is a schematic cross-sectional view of a display device according to an embodiment.

FIG. 6 is an exploded perspective view of the display device DD of an embodiment. FIG. 7 is a schematic cross-sectional view of the display device DD of an embodiment. FIG. 7 may be a schematic cross-sectional view corresponding to line I-I' of FIG. 1.

The display device DD of an embodiment may include a display module DM and a window WP disposed on the display module DM. In the display device DD of an embodiment, the display module DM may include a display panel DP including a display element layer DP-EL and an input sensor TP disposed on the display panel DP. The display device DD of an embodiment may include an adhesive member AP disposed between the display panel DP and the window WP. For example, in the display device DD of an embodiment, the adhesive member AP may be disposed between the input sensor TP and the window WP. The adhesive member AP may be an optically clear adhesive (OCA) film or an optically clear adhesive resin (OCR) layer.

The adhesive member AP may be formed from a resin composition of an embodiment. The adhesive member AP may include a polymer derived from the resin composition of an embodiment.

The resin composition of an embodiment may include a bifunctional (meth)acrylate monomer. In an embodiment, a content of the bifunctional (meth)acrylate monomer may be less than about 1 wt % based on a total weight of the resin composition.

In the specification, (meth)acrylate means acrylate or methacrylate.

In the specification, a bifunctional (meth)acrylate monomer means a (meth)acrylate monomer having two functional groups. For example, a bifunctional (meth)acrylate monomer may be a (meth)acrylate monomer in which 1 molecule contains 2 (meth)acryloyl groups. In the resin composition of an embodiment, a bifunctional (meth)acrylate monomer may include monomers that are different from each other. For example, in the resin composition of an embodiment, a bifunctional (meth)acrylate monomer may include at least one bifunctional (meth)acrylate monomer and at least one bifunctional methacrylate monomer.

As a bifunctional (meth)acrylate monomer, the resin composition of an embodiment may include 1,4-butanediol di(meth)acrylate, 1,3-butylene glycol di(meth)acrylate, 1,6-hexanediol di(meth)acrylate, 1,8-octanediol di(meth)acrylate, 1,9-octanediol diacrylate, 1,9-nonanediol diacrylate, 1,12-dodecanediol di(meth)acrylate, neopentyl glycol di(meth)acrylate, dicyclopentanyl di(meth)acrylate, cyclohexane-1,4-dimethanol di(meth)acrylate, tricyclodecanedimethanol (meth)diacrylate, dimethylol dicyclopentane di(meth)acrylate, neopentyl glycol-modified trimethylpropane di(meth)acrylate, adamantane di(meth)acrylate, trimethylolpropane tri(meth)acrylate, or a mixture thereof.

The resin composition of an embodiment may further include at least one of a urethane (meth)acrylate oligomer, and a (meth)acrylate monomer containing a hydroxy group (—OH). The resin composition of an embodiment may further include at least one photoinitiator.

The resin composition of an embodiment may include a urethane (meth)acrylate oligomer having a weight average molecular weight (Mw) equal to or greater than about 10,000. In the resin composition of an embodiment, a weight average molecular weight of a urethane (meth)acrylate oligomer may be in a range of about 27,000 to about 50,000. In an embodiment, a urethane (meth)acrylate oligomer may include a photocurable compound containing at least one (meth)acryloyl group having a urethane bond. A urethane (meth)acrylate oligomer may include at least one of an acrylate having a urethane bond, a urethane acrylate having a polycarbonate backbone, and a urethane acrylate having a polyether backbone. For example, a resin composition of an embodiment may include a urethane acrylate oligomer, and may include at least one of UV-3700B (Mitsubishi Chemical Co., Ltd.), UA-3563PP (Shinnakamura Chemical Industry Co., Ltd), or UF-07DF (Mitsubishi Chemical Co., Ltd.).

A resin composition containing a urethane (meth)acrylate oligomer having a weight average molecular weight equal to or greater than about 10,000 may exhibit low-viscosity properties which allow the composition to be applied by a method such as an ink-jet printing method or a dispensing coating method. A urethane (meth)acrylate oligomer having a weight average molecular weight equal to or greater than about 10,000 may be included in a resin composition while being in the state of an oligomer having a relatively high degree of polymerization and may maintain a high degree of polymerization after photocuring, and thus, may exhibit a low storage modulus G' value and high peel force properties.

The resin composition of an embodiment may further include a (meth)acrylate monomer containing a hydroxy group. For example, the resin composition of an embodiment may include a (meth)acrylate monomer containing a hydroxy group, and may include 4-hydroxybutyl acrylate, 10-hydroxydecyl acrylate, or 6-hydroxyhexyl acrylate, or a mixture thereof.

The resin composition of an embodiment may include at least one photoinitiator. When multiple photoinitiators are included, different photoinitiators may be activated by ultraviolet light with different center wavelengths.

The photoinitiator may be any one selected from 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

The photoinitiator may be any one selected from 2-methyl-1[4-(methylthio)phenyl]-2-morpholinopropan-1-one, 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl]titanium(IV).

The resin composition of an embodiment may not include a separate organic solvent. For example, the resin composition of an embodiment may include an organic solvent, wherein a content of the organic solvent may be less than about 0.5 wt % based on a total weight of the resin composition. For example, a content of the organic solvent in the resin composition may be less than about 0.1 wt %, based on 100 wt % of the total resin composition. The resin composition of an embodiment may improve the processability of the resin composition by not including an organic solvent or by including an organic solvent in an amount of less than about 0.5 wt % based on a total weight of the resin composition.

The resin composition of an embodiment may have a viscosity equal to or less than about 20 mPa·s at a temperature in a range of about 30° C. to about 50° C. For example, the resin composition of an embodiment may have a viscosity in a range of about 1.0 mPa·s to about 20 mPa·s at a temperature in a range of about 30° C. to about 50° C. For example, the resin composition may have a viscosity in a range of about 1.0 mPa·s to about 20 mPa·s at about 40° C. The viscosity of the resin composition was measured according to JIS Z8803. For example, the resin composition of an embodiment may have a viscosity equal to or less than about 20 mPa·s at a temperature in a range of about 30° C. to about 50° C. as measured according to JIS Z8803.

In case that the viscosity of the resin composition of an embodiment is less than about 1.0 mPa·s, the viscosity may be too low to cause a resin composition liquid provided for the formation of an adhesive member to flow, and accordingly, it may be difficult to form a coating layer having a uniform thickness using the resin composition. In case that the viscosity of the resin composition of an embodiment is greater than about 20 mPa·s, it may be difficult for the resin composition to be discharged from a coating device which is used to coat the resin composition in an appropriate amount.

The resin composition of an embodiment may be photo-cured. For example, the resin composition may be cured by irradiating ultraviolet light.

The resin composition of an embodiment may have a storage modulus in a range of about $1.7 \times 10^5$ Pa to about $3.0 \times 10^5$ Pa at about −20° C., a storage modulus in a range of about $1.5 \times 10^4$ Pa to about $6 \times 10^4$ Pa at about 25° C., and a storage modulus in a range of about $1.5 \times 10^4$ Pa to about $6 \times 10^4$ Pa at 60° C.

In case that a storage modulus of the resin composition at about −20° C. is less than about $1.7 \times 10^5$ Pa, or a storage modulus of the resin composition at about 25° C. is less than about $1.5 \times 10^4$ Pa, or a storage modulus of the resin composition at about 60° C. is less than about $1.5 \times 10^4$ Pa, the resin composition may not achieve sufficient adhesive strength after curing.

In case that a storage modulus of the resin composition at about −20° C. is greater than about $3.0 \times 10^5$ Pa, or a storage modulus at about 25° C. is greater than about $6 \times 10^4$ Pa, or a storage modulus at about 60° C. is greater than about $6 \times 10^4$ Pa, bending resistance may be degraded after curing the resin composition.

A ratio of the storage modulus of the resin composition at about 25° C. to the storage modulus of the resin composition at about −20° C. may be in a range of about 0.05 to about 1. For example, a value of (Storage modulus at 25° C.)/(Storage modulus at −20° C.) may be in a range of about 0.05 to about 1. For example, a ratio of the storage modulus at about 25° C. to the storage modulus at about −20° C. may be in a range of about 0.1 to about 0.95. For example, a ratio of the storage modulus at about 25° C. to the storage modulus at about −20° C. may be in a range of about 0.12 to about 0.8. For example, a ratio of the storage modulus at about 25° C. to the storage modulus at about −20° C. may be in a range of about 0.15 to about 0.5.

A ratio of the storage modulus at about 60° C. to the storage modulus at about −20° C. may be in a range of about 0.05 to about 1. For example, a ratio of the storage modulus at about 60° C. to the storage modulus at about −20° C. may be in a range of about 0.06 to about 0.95. For example, a ratio of the storage modulus at about 60° C. to the storage modulus at about −20° C. may be in a range of about 0.07 to about 0.8. For example, a ratio of the storage modulus at about 60° C. to the storage modulus at about −20° C. may be in a range of about 0.08 to about 0.5.

The resin composition may have a storage modulus at about −20° C. in a range of about $1.7 \times 10^5$ Pa to about $3.0 \times 10^5$ Pa, may have a storage modulus in a range of about $1.5 \times 10^4$ Pa to about $6 \times 10^4$ Pa at about 25° C., and may have a storage modulus in a range of about $1.5 \times 10^4$ Pa to about $6 \times 10^4$ Pa at about 60° C., and thus, may exhibit sufficient adhesive strength and bending resistance after curing. When an adhesive member formed of the resin composition of an embodiment is applied to a foldable display device, the folding properties and the durability of the display device may be improved.

The display panel DP of an embodiment may include a base substrate BS, a circuit layer DP-CL disposed on the base substrate BS, a display element layer DP-EL disposed on the circuit layer DP-CL, and an encapsulation layer TFE disposed on the display element layer DP-EL. For example, the display panel DP may include organic light emitting elements or quantum dot light emitting elements in the display element layer DP-EL.

Configurations of the display panel DP shown in FIG. 7 and the like are merely illustrative, and the configuration of the display panel DP is not limited to that which are illustrated in FIG. 7 and the like. For example, in an embodiment, the display panel DP may include a liquid crystal element, and the encapsulation layer TFE may be omitted.

The input sensor TP may be disposed on the display panel DP. For example, the input sensor TP may be directly disposed on the encapsulation layer TFE of the display panel DP. The input sensor TP may sense an external input and may change the same into an input signal, and may provide the input signal to the display panel DP. For example, in the display device DD of an embodiment, the input sensor TP may be a touch sensing unit for sensing a touch. The input sensor TP may sense a direct touch of a user, an indirect touch of a user, a direct touch of an object, or an indirect touch of an object, and the like. The input sensor TP may sense at least one of a position of a touch and an intensity (pressure) of a touch which is applied externally. The input sensor TP of an embodiment may have various configurations, or may be composed of various materials, and is not limited to any one embodiment. The input sensor TP may include sensing electrodes (not shown) for sensing an external input. The sensing electrodes (not shown) may sense an external input in a capacitive manner. The display panel DP may be provided with an input signal from the input sensor TP, and may generate an image corresponding to the input signal.

The window WP may protect the display panel DP and the input sensor TP. The image IM generated in the display panel DP may be provided to a user by being transmitted through the window WP. The window WP may provide a touch surface of display device DD. In the display device DD including the folding region FA, the window WP may be a flexible window.

The window WP may include a base layer BL and a print layer BM. The window WP may include a transmission region TA and a bezel region BZA. The front surface of the window WP including the transmission region TA and the bezel region BZA may correspond to the front surface of the display device DD.

The transmission region TA may be an optically transparent region. The bezel region BZA may be a region having a relatively low light transmittance compared to the transmission region TA. The bezel region BZA may have a color. The bezel region BZA is adjacent to the transmission region TA, and may surround the transmission region TA. The bezel region BZA may define a shape of the transmission region TA. However, the embodiment is not limited to what is illustrated. The bezel region BZA may be disposed adjacent to only one side of the transmission region TA, or a portion thereof may be omitted.

The base layer BL may include a glass or plastic substrate. For example, a tempered glass substrate may be used as the base layer BL. In an embodiment, the base layer BL may be formed of a polymer resin having flexibility. For example, the base layer BL may be made of polyimide, polyacrylate, polymethylmethacrylate, polycarbonate, polyethylenenaphthalate, polyvinylidene chloride, polyvinylidene difluoride, polystyrene, an ethylene vinyl alcohol copolymer, or a combination thereof. However, embodiments are not limited thereto. Any general form which may be used as the base layer BL of the window WP in the art may be used without limitation.

The print layer BM may be disposed on a surface of the base layer BL. In an embodiment, the print layer BM may be provided on a lower surface of the base layer BL which is adjacent to the display module DM. The print layer BM may be disposed on an edge region of the base layer BL. The print layer BM may be an ink print layer. The print layer BM may be a layer formed by including a pigment or a dye. In the window WP, the bezel region BZA may be a portion in which the print layer BM is provided.

The window WP may further include at least one functional layer (not shown) provided on the base layer BL. For example, the functional layer (not shown) may be a hard coating layer, an anti-fingerprint layer, and the like, but embodiments are not limited thereto.

There may be a step between a portion provided with the print layer BM and a portion without the printing layer BM in the base layer BL. The adhesive member AP of an embodiment formed from the resin composition of an embodiment described above may have a low storage modulus and a high adhesion force value, and thus, may be attached to the window WP without being separated at the step portion.

The adhesive member AP according to an embodiment may include a polymer derived from the resin composition of an embodiment described above. For example, the adhesive member AP may include a polymer derived from a resin composition which may have a viscosity equal to or less than about 20 mPa·s at a temperature in a range of about 30° C. to about 50° C. as measured according to JIS Z8803, a storage modulus in a range of about $1.7 \times 10^5$ Pa to about $3 \times 10^5$ Pa at about −20° C., and a storage modulus in a range of about $1.5 \times 10^4$ Pa to about $6 \times 10^4$ Pa at about 25° C. The adhesive member AP of an embodiment may include a polymer derived from a resin composition including a bifunctional (meth)acrylate monomer, a (meth)acrylate monomer containing a hydroxy group, a urethane (meth)acrylate oligomer, and a photoinitiator. The resin composition including a bifunctional (meth)acrylate monomer, a (meth)acrylate monomer containing a hydroxy group, a urethane (meth)acrylate oligomer, and a photoinitiator may be applied with the same description as the description provided for the resin composition of an embodiment described above.

The adhesive member AP according to an embodiment may have a 1800 peel strength equal to or greater than about 1 kg/25 mm. Accordingly, the adhesive member AP according to an embodiment may have excellent bending resistance and durability. A detailed description about the measurement of peel strength and the like will be provided later.

The adhesive member AP included in the display device DD of an embodiment may be formed by providing a liquid resin composition on a surface of the window WP or a surface of the display module DM, and ultraviolet curing the liquid resin composition provided between the window WP and the display module DM. In another embodiment, the adhesive member AP may be provided by ultraviolet curing a liquid resin composition in a separate process to provide the adhesive member AP, followed by laminating a surface of the cured adhesive member AP in the form of an adhesive film on a surface of the window WP or a surface of the display module DM, and attaching a side of the window WP or a side of the display module DM which is unattached to another surface of the adhesive member AP.

A thickness of the adhesive member AP may be in a range of about 50 m to about 200 m. For example, the adhesive member AP may have a thickness in a range of about 100 m to about 150 m.

Figure 8A:
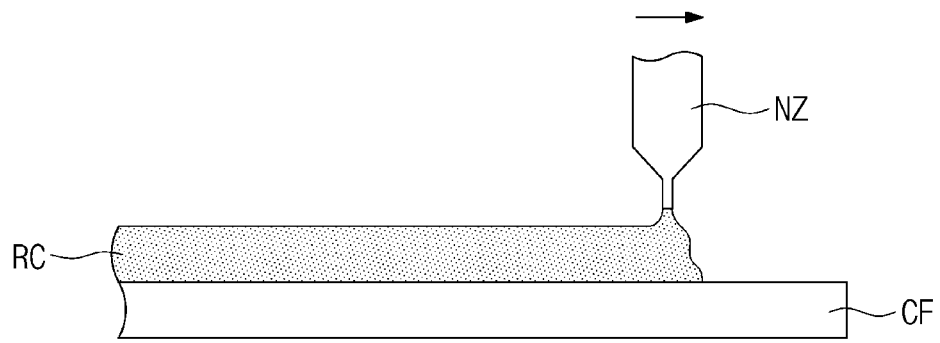
FIG. 8A to FIG. 8C are schematic cross-sectional views showing a method for preparing an adhesive member of an embodiment.
Figure 8B:
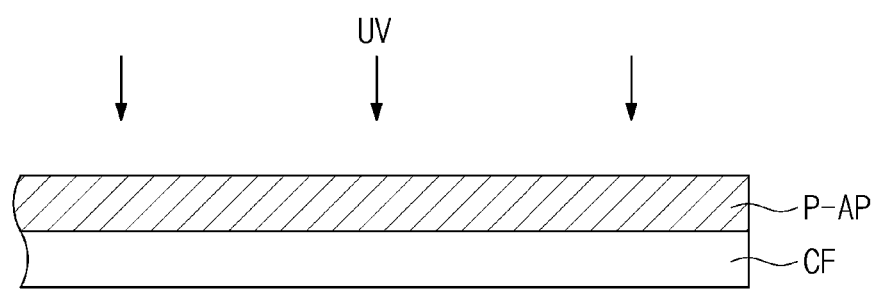
Figure 8C:
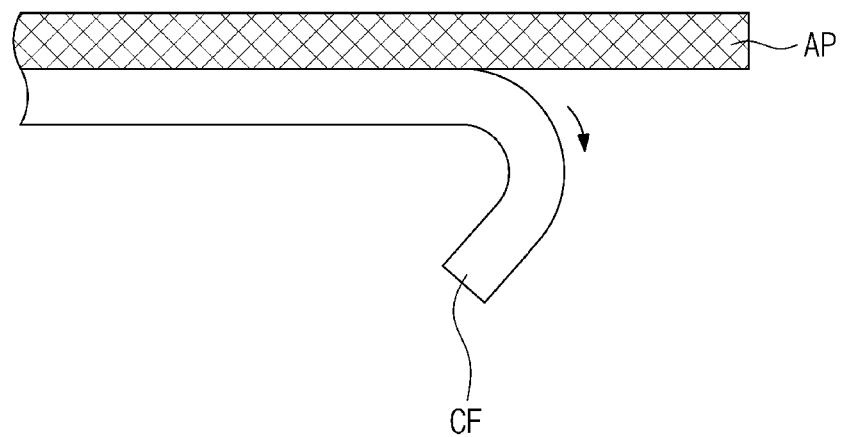

FIG. 8A to FIG. 8C are schematic cross-sectional views showing steps of preparing the adhesive member AP according to an embodiment. FIG. 8A shows a step of providing a resin composition RC for the formation of the adhesive member AP, FIG. 8B shows a step of irradiating ultraviolet light, and FIG. 8C shows a step of removing a carrier film CF.

Referring to FIG. 8A to FIG. 8C, the resin composition RC of an embodiment may be provided on a carrier film CF. For example, a polyethylene terephthalate (PET) film and the like may be used as the carrier film CF, but embodiments are not limited thereto. The carrier film CF serves as a substrate for coating a liquid resin composition RC, and any one which may be easily detached from the adhesive member AP after ultraviolet curing may be used. For example, a surface of the carrier film CF on which the resin composition RC is provided may be release-treated.

The resin composition RC may be provided by a method such as an ink-jet printing method or a dispensing method. The resin composition RC of an embodiment may have a viscosity value in a range of about 1.0 mPa·s to about 20 mPa·s at a temperature in a range of about 30° C. to about 50° C., and thus, may be easily discharged from a nozzle NZ and the like, and may be provided to maintain a suitable coating thickness. For example, the resin composition RC of an embodiment may have a viscosity value in a range of about 1.0 mPa·s to about 20 mPa·s at about 40° C.

A preliminary adhesive member P-AP provided by coating the resin composition RC to a suitable thickness may be irradiated with ultraviolet light UV. FIG. 8B illustrates that the ultraviolet light UV is directly irradiated on coated preliminary adhesive member P-AP, but embodiments are not limited thereto. An auxiliary carrier film (not shown) may be further disposed on the preliminary adhesive member P-AP, and the auxiliary carrier film (not shown) may transmit ultraviolet light and may cover the preliminary adhesive member P-AP during an ultraviolet curing process.

The adhesive member AP may be formed after the ultraviolet curing. The adhesive member AP may be provided by removing the carrier film CF used during the process.

The adhesive member AP prepared through the steps of FIG. 8A to FIG. 8C may be applied to the display device DD described above. For example, a surface of the adhesive member AP may be attached on the display module DM, and the window WP may be attached on another surface of the adhesive member AP which faces the surface attached to the display module DM. In another embodiment, the adhesive member AP may be provided to the display device DD by attaching a surface of the adhesive member AP on a surface of the window WP to face the display module DM, and attaching another surface of the adhesive member AP facing the surface of the adhesive member AP attached to the window WP to the display module DM.

Figure 9A:
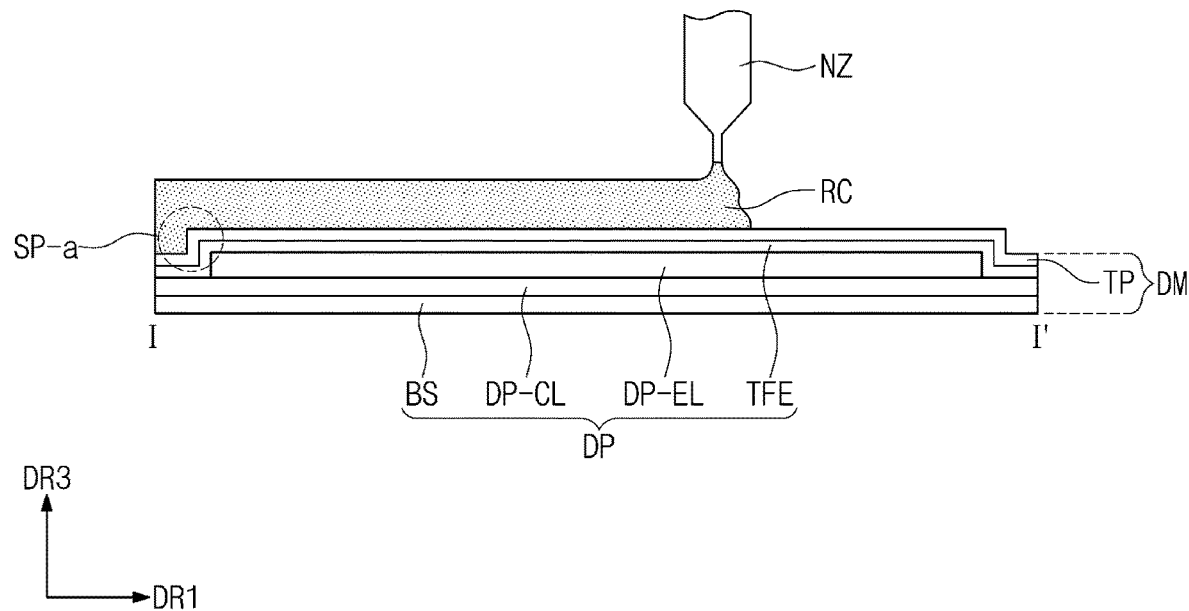
FIG. 9A and FIG. 9B are schematic cross-sectional views showing a method for preparing an adhesive member of an embodiment.
Figure 9B:
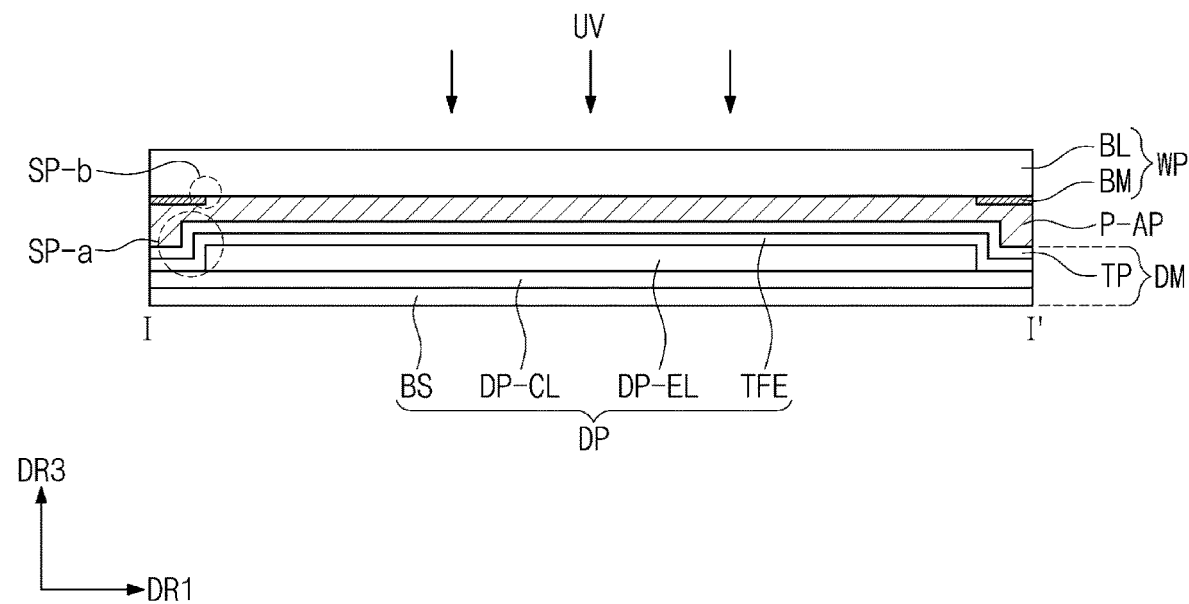

In an embodiment, a liquid resin composition provided between the display module DM and the window WP may be cured to form the adhesive member AP. FIG. 9A and FIG. 9B illustrate steps of preparing the adhesive member AP to be included in the display device DD, which is prepared by a method different from the method for preparing the adhesive member AP described with reference to FIG. 8A to FIG. 8C.

FIG. 9A shows a step of providing the resin composition RC on the display module DM. FIG. 9B shows a step of irradiating ultraviolet light on the preliminary adhesive member P-AP formed from the resin composition RC.

The resin composition RC may be provided by a method such as an ink-jet printing method or a dispensing method. The resin composition RC of an embodiment may have a viscosity value in a range of about 1.0 mPa·s to about 20 mPa·s at about 25° C., and thus, may be easily discharged from the nozzle NZ and the like, and may be provided to maintain a coating thickness while being thin. The resin composition RC may have a viscosity value in a range of about 1.0 mPa·s to about 20 mPa·s, and thus, may be provided while covering the bending of a step portion SP-a of the display module DM. For example, the resin composition RC has a viscosity equal to or less than about 20 mPa·s, and thus, may fill a bent portion such as the step portion SP-a without leaving an empty space. The resin composition RC provided through the nozzle NZ may have a viscosity equal to or greater than about 1.0 mPa·s, and thus, may be uniformly coated to a suitable thickness without flowing out of the display module DM.

The window WP may be provided on the preliminary adhesive member P-AP that is provided by coating the resin composition RC to a suitable thickness. The ultraviolet light UV for curing the resin composition RC may be provided by transmitting through the window WP. When the window WP is provided on the preliminary adhesive member P-AP, the resin composition RC may fill a step portion SP-b without leaving an empty space. For example, since the resin composition RC has a viscosity equal to or less than about 20 mPa·s, the preliminary adhesive member P-AP may be provided in a bent portion such as the step portion SP-a between the base layer BL and the print layer BM while covering the bent shape. The preliminary adhesive member P-AP may be polymerized by the provided ultraviolet light UV and cured to be formed as the adhesive member AP.

Different from what is illustrated in FIG. 9B and the like, the ultraviolet light UV may be provided to the preliminary adhesive member P-AP before the window WP is provided on the preliminary adhesive member P-AP, so that a polymerization reaction may proceed in the resin composition RC. The amount of irradiated ultraviolet light UV may be an amount of light which may completely cure the resin composition RC. However, in another embodiment, the resin composition RC may be partially subjected to the polymerization reaction in the state of the preliminary adhesive member P-AP, and after the window WP is covered, unreacted resin composition RC may be further reacted to finally form the adhesive member AP.

The display devices DD, DD-a, and DD-b according to an embodiment illustrated in FIG. 1 to FIG. 5 include the adhesive member AP containing a polymer derived from the above-described resin composition of an embodiment, and thus, may use the adhesive member AP to maintain the state in which the window WP and the display module DM are attached even in a folded state or in a bending region without the separation of the adhesive member AP.

Figure 10:
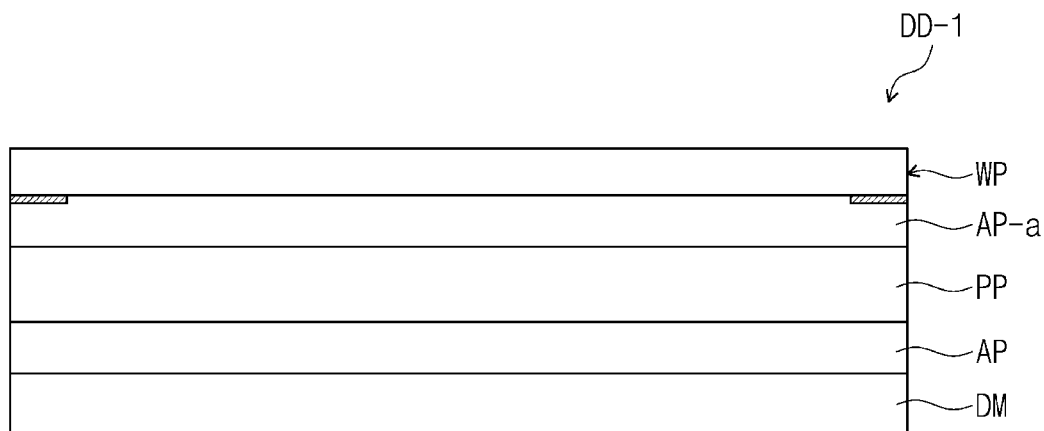
FIG. 10 is a schematic cross-sectional view of a display device according to an embodiment.

FIG. 10 is a schematic cross-sectional view showing a display device according to an embodiment. Hereinafter, in the description of the display device of an embodiment illustrated in FIG. 10, the same contents as those described above with reference to FIG. 1 to FIG. 9B will not be described again. Instead, differences will be described.

Compared to the display device DD described with reference to FIG. 6 and FIG. 7, a display device DD-1 of an embodiment illustrated in FIG. 10 may further include a light control layer PP and an optical adhesive layer AP-a. The display device DD-1 of an embodiment may further include the light control layer PP disposed between the adhesive member AP and the window WP, and the optical adhesive layer AP-a disposed between the light control layer PP and the window WP.

The light control layer PP may be disposed on the display panel DP to control light reflected in the display panel DP from an external light. The light control layer PP may include, for example, a polarizing layer or a color filter layer.

The optical adhesive layer AP-a may be an optically clear adhesive (OCA) film or an optically clear adhesive resin (OCR) layer. The optical adhesive layer AP-a may also be formed from the resin composition of an embodiment as described above for the adhesive member AP (see FIG. 7). For example, the optical adhesive layer AP-a may include a polymer derived from a resin composition including a bifunctional (meth)acrylate monomer, a (meth)acrylate monomer containing a hydroxy group, a urethane (meth)acrylate oligomer, and at least one photoinitiator.

A resin composition before a reaction by a photoinitiator may be applied with the same description for the resin composition described above. Accordingly, the optical adhesive layer AP-a of an embodiment may exhibit high adhesiveness and an appropriate modulus of elasticity.

The display device DD-1 of an embodiment may include the optical adhesive layer AP-a and the adhesive member AP formed from the resin composition of an embodiment, and the optical adhesive layer AP-a and the adhesive member AP may each have high adhesion and an appropriate modulus of elasticity. Therefore, the phenomenon of separation may not occur at an interface of the optical adhesive layer AP-a and the adhesive member AP even in an operational state in which the display device DD-1 is folded or bent, so that excellent reliability properties may be exhibited.

Figure 11:
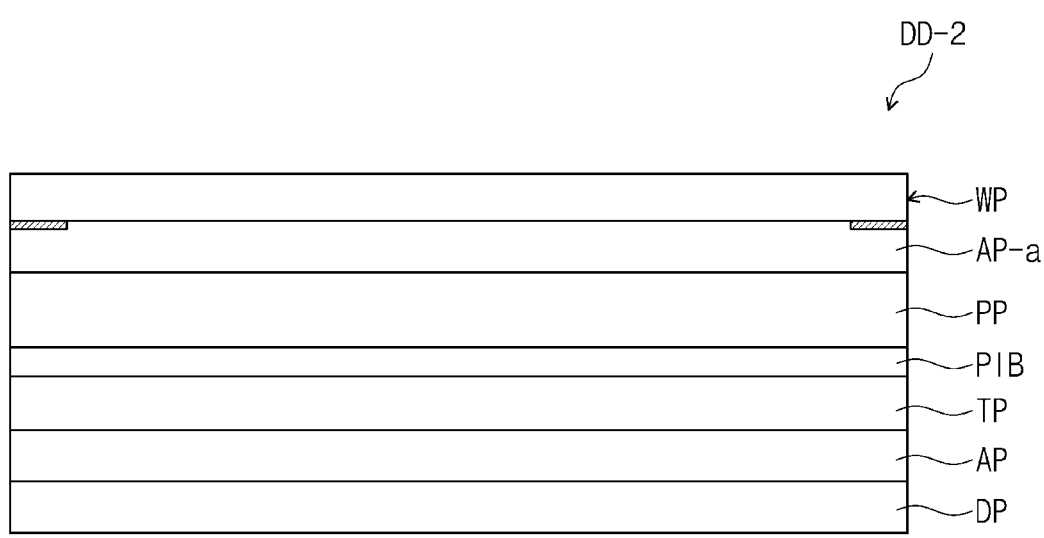
FIG. 11 is a schematic cross-sectional view of a display device according to an embodiment.

FIG. 11 is a schematic cross-sectional view showing a display device according to an embodiment. Hereinafter, in the description of the display device of an embodiment illustrated in FIG. 11, the same contents as those described above with reference to FIG. 1 to FIG. 10 will not be described again. Instead, differences will be described.

Compared to the display device DD described with reference to FIG. 6 and FIG. 7, a display device DD-2 of an embodiment illustrated in FIG. 11 may further include a light control layer PP, an optical adhesive layer AP-a, and an interlayer adhesive layer PIB. The display device DD-2 of an embodiment may further include the light control layer PP disposed between the adhesive member AP and the window WP, and the optical adhesive layer AP-a disposed between the light control layer PP and the window WP, as shown for the display device DD-1 of an embodiment illustrated in FIG. 10.

In the display device DD-2 of an embodiment, the adhesive member AP may be provided between the display panel DP and the input sensor TP. For example, the input sensor TP is not directly disposed on the display panel DP, but instead, the display panel DP may be bonded to the input sensor TP by the adhesive member AP. For example, the adhesive member AP may be disposed between the encapsulation layer TFE (see FIG. 7) of the display panel DP and the input sensor TP.

Below the light control layer PP, the interlayer adhesive layer PIB may be provided. The interlayer adhesive layer PIB may be disposed between the input sensor TP and the light control layer PP, and may be formed of an adhesive material having excellent moisture permeation prevention properties. For example, the interlayer adhesive layer PIB may be formed by including polyisobutylene. The interlayer adhesive layer PIB may be disposed on the input sensor TP to prevent the corrosion of sensing electrodes of the input sensor TP.

The display device DD-2 of an embodiment includes the optical adhesive layer AP-a and the adhesive member AP formed from the resin composition of an embodiment, and the optical adhesive layer AP-a and the adhesive member AP may exhibit high adhesiveness and an appropriate modulus of elasticity. Therefore, the phenomenon of separation does not occur at an interface of the optical adhesive layer AP-a and the adhesive member AP even in an operational state in which the display device DD-2 is folded or bent, so that excellent reliability properties may be exhibited.

Hereinafter, referring to Examples and Comparative Examples, a resin composition according to an embodiment, an adhesive member, and a display device of an embodiment will be described in detail. The following Examples are for illustrative purposes only to facilitate the understanding of the disclosure, and thus, embodiments and the scope of the disclosure are not limited thereto.

EXAMPLES

1. Preparation of curable liquid resin composition

Resin compositions of Examples were prepared according to blending ratios listed in Table 1. Resin compositions of Comparative Examples were prepared according to blending ratios listed in Table 2.

Constituent materials of Examples and Comparative Examples were provided to a heat-resistant light-blocking container in the wt % disclosed in Table 1 and Table 2, and 2 wt % of Omnirad TPO-H (2,4,6-trimethylbenzoyl-diphenylphosphine oxide) was provided as a photoinitiator based on 100 wt % of the total resin composition. The provided materials were stirred at room temperature for 1 hour at 10 rpm using a three-one motor (Shinto Science Co., Ltd) to prepare a curable liquid resin composition.

TABLE 1

| Materials | Example 1 | Example 2 | Example 3 | Example 4 |
|---|---|---|---|---|
| UV-3700B | 5.3 | 5.3 | 5.2 | 5.1 |
| UA-3563PP | — | — | — | — |
| UF-07DF | — | — | — | — |
| Viscoat #195 | 0.3 | 0.9 | — | — |
| Viscoat #260 | — | — | 0.4 | 0.5 |
| 4-HBA | 2.4 | 2.4 | 2.4 | 2.4 |
| SYA004 | 41 | 41 | 41 | 41 |
| IDAA | 51 | 51 | 51 | 51 |
| EHDG-AT | — | — | — | — |
| 2-EHA | — | — | — | — |

TABLE 2

| Materials | Comparative Example 1 | Comparative Example 2 | Comparative Example 3 | Comparative Example 4 | Comparative Example 5 | Comparative Example 6 |
|---|---|---|---|---|---|---|
| UV-3700B | 5.8 | 10 | — | — | — | 10 |
| UA-3563PP | — | — | — | 10 | 10 | — |
| UF-07DF | — | — | — | — | 5 | — |
| Viscoat #195 | 1 | — | — | — | — | — |
| Viscoat #260 | — | — | — | — | — | — |
| 4-HBA | 2.5 | — | 17 | 16 | 25 | 15 |
| SYA004 | 45.7 | — | — | — | — | 35 |
| IDAA | 45 | 90 | 83 | — | — | 40 |
| EHDG—AT | — | — | — | 33 | 27 | — |
| 2-EHA | — | — | — | 41 | 33 | — |

<Data on Materials Used as Constituent Components of Examples and Comparative Examples>

Data on each constituent component used in Examples and Comparative Examples disclosed in Table 1 and Table 2 above are as follows.

UV-3700B: Urethane acrylate, a product of Mitsubishi Chemical Co., Ltd.

UA-3563PP: Urethane acrylate, a product of Shinnakamura Chemical Industry Co., Ltd.

UF-07DF: Urethane acrylate, a product of Mitsubishi Chemical Co., Ltd.

Viscoat #195: 1,4-butanediol diacrylate, a product of Osaka Organic Chemical Industry Co., Ltd.

Viscoat #260: 1,9-nonanediol diacrylate, a product of Osaka Organic Chemical Industry Co., Ltd.

4-HBA: 4-hydroxybutyl acrylate, a product of Osaka Organic Chemical Industry Co., Ltd.

SYA004: 10-hydroxydecyl acrylate, a product of Sanyu Chemical Research Institute, Co., Ltd.

IDAA: Isodecyl acrylate, a product of Osaka Organic Chemical Industry Co., Ltd.

EHDG-AT: 2-ethylhexyl-diglycol acrylate, a product of Kyoesha Chemical Industry Co., Ltd.

2-EHA: 2-ethylhexyl acrylate, a product of Tokyo Chemical Industry Co., Ltd.

2. Evaluation of physical properties of resin composition and adhesive member formed from resin composition In Table 3 and Table 4 below, the viscosity of a resin composition having a composition ratio of Table 1 and Table 2 above, the ink-jet eligibility of the resin composition, and the storage modulus according to the temperature, ratio of the storage modulus according to the temperature, bendability, and peel strength of an adhesive member formed from the resin composition were measured and shown. In Table 3, the measurement results of the resin compositions of Examples of Table 1 above are shown. In Table 4, the measurement results of the resin compositions of Comparative Examples of Table 2 above are shown.

The viscosity of a resin composition, the ink-jet eligibility of the resin composition, and the storage modulus according to the temperature, ratio of the storage modulus according to the temperature, bendability, and peel strength of and adhesive member formed from the resin composition were measured by the following method.

[Method for Measuring Viscosity]

The viscosity of a resin composition described in the specification was measured at 40° C. according to JIS Z8803, and was measured under the rate condition of a 10 rpm using a viscometer (TOKI SANGYO Co., Ltd.).

[Ink-Jet Eligibility]

The blended curable resin composition was applied on a slide glass (Slide glass S1112, a product of Matsunami Glass) using an ink-jet device (Device printer-CX, a product of MICROJET Co., Ltd), and the coated surface on the slide glass was visually observed to see if discharge was normally achieved. The observation results were denoted as follows.

O: Coating was achieved normally.

X: Liquid was not discharged from a nozzle, and coating was not achieved.

[Preparation of Test Piece for Measuring Storage Modulus]

On a slide glass (Slide glass S1112, a product of Matsunami Glass), a PET film (NP100A, a product of *Panax* having a thickness of 100 m) and a silicone rubber on which a hole having a diameter of 8 mm is punched were sequentially laminated, and 29 μL of the curable liquid resin composition was disposed into the silicone rubber hole. Using a UV LED lamp having a peak of 365 nm, ultraviolet light was irradiated on the slide glass until an accumulated amount of light of 150 mJ/cm² was achieved. A PET film (NP100A, a product of *Panax* having a thickness of 100 m) and a slide glass (Slide glass S1112, a product of Matsunami Glass) were sequentially laminated, and using a metal halide lamp (a conveyor-type UV irradiation device, a product of iGraphics), ultraviolet light was irradiated until an accumulated amount of light of 4000 mJ/cm² was achieved to cure a resin composition, thereby obtaining a sample having a diameter of 8 mm. In the specification, the accumulated amount of light means the total amount of light irradiated on a target to be irradiated. For example, the accumulated amount of light of ultraviolet light means the total amount of ultraviolet light irradiated on a target to be irradiated.

[Measurement of Storage Modulus]

The storage modulus of a sample obtained above was measured according to JIS K7244-7 using a viscoelasticity meterMCR302 (a product of Anton-Paar Co., Ltd.). The measurement was performed under the conditions of a measurement temperature range of −20° C. to 60° C. and a measurement frequency of 1 Hz. From the measurement results, the storage modulus at each of −20° C., 25° C., and 60° C. were recorded. In Table 3 and Table 4, the storage modulus at −20° C. was denoted by G'@−20° C. The storage modulus at 25° C. was denoted by G'@25° C. The storage modulus at 60° C. was denoted by G'@60° C. The storage modulus at 25° C. against the storage modulus at −20° C. was denoted by G'@25° C./G'@−20° C. The storage modulus at 60° C. against the storage modulus at −20° C. was denoted by G'@60° C./G'@−20° C.

[Preparation of Test Piece for Measuring Bending Reliability]

On a PET film (A4100, a product of Toyobo Co., Ltd having a thickness of 100 m), 0.6 mL of the blended curable resin composition was disposed, and evenly spread using a wire bar of #150. Using a UV LED lamp having a peak of 365 nm, ultraviolet light was irradiated on the PET film on which the curable liquid resin composition was applied until an accumulated amount of light of 150 mJ/cm² was achieved. The PET film on which ultraviolet light was irradiated and another PET film (A4100, a product of Toyobo Co., Ltd having a thickness of 100 m) were bonded together using a 2 kg hand roller. In the bonded state, from the bonded PET film side, ultraviolet light was irradiated until an accumulated amount of light of 4000 mJ/cm² was achieved to cure a resin composition using a metal halide lamp (a conveyor-type UV irradiation device, a product of iGraphics), and a sample was cut to 50 mm in width and 200 mm in length to obtain a sample.

[Method for Testing Bending Reliability]

The sample obtained above was bent for 30,000 times at 23° C. with a bending diameter of 3 mm using a durability tester (a non-load U-shaped stretch tester, a product of Yuasa System Equipment Co., Ltd.). After the test, the test piece was visually observed to confirm the peeling thereof, and was denoted by pass in case that there was no peeling, and denoted by no pass in case that there was peeling.

[Preparation of Test Piece for Peel Strength]

On a slide glass (Slide glass S1112, a product of Matsunami Glass), 0.6 mL of the blended curable resin composition was disposed, and evenly spread using a wire bar of #150. Using a UV LED lamp having a peak of 365 nm, ultraviolet light was irradiated on the slide glass on which the curable liquid resin composition was applied until an accumulated amount of light of 150 mJ/cm² was achieved. The slide glass on which ultraviolet light was irradiated and a PET film (A4100, a product of Toyobo Co., Ltd having a thickness of 100 m) were bonded together using a 2 kg hand roller. In the bonded state, from the PET film side, ultraviolet light was irradiated until an accumulated amount of light of 4000 mJ/cm² was achieved to cure a resin composition using a metal halide lamp (a conveyor-type UV irradiation device, a product of iGraphics).

[Measurement of Peel Strength]

The peel strength of the test piece obtained above was measured using a universal material tester (5965 type, a product of Instron Co., Ltd.) at a rate of 300 mm per minute to achieve a peeling angle of 180°. The peel strength was the average value of about 50 mm peeling.

TABLE 3

| Evaluation items | Example 1 | Example 2 | Example 3 | Example 4 |
| --- | --- | --- | --- | --- |
| Viscosity (mPa · s) | 14 | 14 | 14 | 14 |
| Ink-jet eligibility evaluation | ○ | ○ | ○ | ○ |
| G'@−20° C.(Pa) | $2.2 \times 10^5$ | $2.9 \times 10^5$ | $2.1 \times 10^5$ | $2.8 \times 10^5$ |
| G'@25° C.(Pa) | $3.3 \times 10^4$ | $5.8 \times 10^4$ | $3.8 \times 10^4$ | $4.2 \times 10^4$ |
| G@25° C./G'@−20° C. | 0.15 | 0.2 | 0.18 | 0.15 |
| G'@60° C.(Pa) | $2.0 \times 10^4$ | $4.9 \times 10^4$ | $2.7 \times 10^4$ | $2.9 \times 10^4$ |
| G'@60° C./G'@−20° C. | 0.09 | 0.17 | 0.12 | 0.1 |
| Bending properties evaluation | Pass | Pass | Pass | Pass |
| Peel strength (kg/25 mm) | 1.4 | 1 | 1.4 | 1.3 |

Referring to the results of Table 3, it can be confirmed that Example 1 to Example 4 have a low viscosity of 20 mPa·s or less in a resin composition state. The resin compositions of Example 1 to Example 4 have low-viscosity properties, and thus, may be used to form a thin uniform coating film, and were all normally coated in the ink-jet eligibility evaluation. When the storage modulus thereof was measured, the resin compositions of Example 1 to Example 4 had a storage modulus at −20° C. G'@−20° C. of $1.7 \times 10^5$ Pa to $3 \times 10^5$ Pa, and had a storage modulus at 25° C. G'@25° C. and a storage modulus at 60° C. G'@60° C. both satisfying $1.5 \times 10^4$ Pa to $6 \times 10^4$ Pa. The storage modulus at 25° C. against the storage modulus at −20° C. G'@25° C./G'@−20° C. was 0.05 to 1, and the storage modulus at 60° C. against the storage modulus at −20° C. G'@60° C./G'@−20° C. was 0.05 to 1.

Accordingly, the resin compositions of Examples had no defects such as peeling, separation, dislocation, buckling, and the like in the bending evaluation, and all had a peel strength of 1 kg/25 mm, thereby exhibiting excellent peel strength.

since the resin composition was not discharged from the nozzle in the ink-jet eligibility evaluation, and a sample for the evaluation could not be prepared. The resin compositions of Comparative Example 1 to Comparative Example 5 did not have the storage modulus at −20° C. G'@−20° C. in the range of $1.7 \times 10^5$ Pa to $3 \times 10^5$ Pa, the storage modulus at 25° C. G'@25° C. in the range of $1.5 \times 10^4$ Pa to $6 \times 10^4$ Pa, or the storage modulus at 60° C. G'@60° C. in the range of $1.5 \times 10^4$ Pa to $6 \times 10^4$ Pa.

The resin compositions of Comparative Example 2 to Comparative Example 5 did not have the storage modulus at 25° C. against the storage modulus at −20° C. G'@25° C./G'@−20° C. of 0.05 to 1, or the storage modulus at 60° C. against the storage modulus at −20° C. G'@60° C./G'@−20° C. of 0.05 to 1.

Accordingly, the resin compositions of Comparative Examples all had defects such as peeling, separation, dislocation, buckling, and the like in the bending evaluation, and all had a peel strength of less than 1 kg/25 mm.

Referring to Table 3 and Table 4 together, the resin compositions of Example 1 to Example 4 had the storage modulus at −20° C. G'@−20° C. of $1.7 \times 10^5$ Pa to $3 \times 10^5$ Pa, and had the storage modulus at 25° C. G'@25° C. and the storage modulus at 60° C. G'@60° C. both satisfying $1.5 \times 10^4$ Pa to $6 \times 10^4$ Pa. The storage modulus at 25° C. against the storage modulus at −20° C. G'@25° C./G'@−20° C. was 0.05 to 1, and the storage modulus at 60° C. against the storage modulus at −20° C. G'@60° C./G'@−20° C. was 0.05 to 1, so that excellent adhesive strength and bending resistance may be achieved after curing.

Through the above, the display device of an embodiment may exhibit good reliability without having the peeling or separation of an adhesive member in a bend portion by including the adhesive member formed through the resin composition of an embodiment, and may exhibit excellent operational reliability without having the peeling of members adjacent to the adhesive member even in a bending or folding operational state.

TABLE 4

| Evaluation items | Comparative Example 1 | Comparative Example 2 | Comparative Example 3 | Comparative Example 4 | Comparative Example 5 | Comparative Example 6 |
| --- | --- | --- | --- | --- | --- | --- |
| Viscosity (mPa · s) | 16 | 10 | 9 | 14 | 18 | 30 |
| Ink-jet eligibility evaluation | ○ | ○ | ○ | ○ | ○ | X |
| G'@−20° C.(Pa) | $3.1 \times 10^5$ | $5.0 \times 10^4$ | $6 \times 10^4$ | $1.1 \times 10^5$ | $1.6 \times 10^5$ | — |
| G'@25° C.(Pa) | $1.0 \times 10^5$ | $4.0 \times 10^3$ | $1.5 \times 10^3$ | $1.4 \times 10^4$ | $4.9 \times 10^4$ | — |
| G@25° C./G'@−20° C. | 0.32 | 0.08 | 0.025 | 0.12 | 0.31 | — |
| G'@60° C.(Pa) | $1.0 \times 10^5$ | $5.0 \times 10^2$ | $2 \times 10^1$ | $2.9 \times 10^3$ | $4.1 \times 10^4$ | — |
| G'@60° C./G'@−20° C. | 0.32 | 0.01 | 0.0003 | 0.026 | 0.26 | — |
| Bending properties evaluation | No pass | No pass | No pass | No pass | No pass | — |
| Peel strength (kg/25 mm) | 0.6 | 0.8 | 0.2 | 0.3 | 0.9 | — |

Referring to the results of Table 4, Comparative Example 1 to Comparative Example 5 have a low viscosity of 20 mPa-s or less in a resin composition state. Accordingly, Comparative Example 1 to Comparative Example 5 were all normally coated in the ink-jet eligibility evaluation. Comparative Example 6 has a viscosity of 30 mPa-s in a resin composition state, and thus, has a viscosity higher than those of Examples 1 to 4 and Comparative Examples 1 to 5. Accordingly, Comparative Example 6 could not be coated A resin composition of an embodiment has low-viscosity properties, and thus, may exhibit excellent coating properties for substrates having various shapes.

An adhesive member of an embodiment may have high adhesive strength and excellent bending resistance.

A display device of an embodiment may exhibit excellent reliability in various operational states.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A resin composition comprising at least one bifunctional (meth)acrylate monomer selected from the group consisting of 1,4-butanediol di(meth)acrylate, 1,3-butylene glycol di(meth)acrylate, 1,6-hexanediol di(meth)acrylate, 1,8-octanediol di(meth)acrylate, 1,9-octanediol diacrylate, 1,9-nonanediol diacrylate, 1,12-dodecanediol di(meth)acrylate, neopentyl glycol di(meth)acrylate, dicyclopentanyl di(meth)acrylate, cyclohexane-1,4-dimethanol di(meth)acrylate, tricyclodecanedimethanol (meth)diacrylate, dimethylol dicyclopentane di(meth)acrylate, neopentyl glycol-modified trimethylpropane di(meth)acrylate, adamantane di(meth)acrylate, and trimethylolpropane tri(meth)acrylate,
wherein the resin composition has a viscosity equal to or less than about 20 mPa·s at a temperature in a range of about 30° C. to about 50° C.; and
wherein, after UV curing, the resin composition has;
a storage modulus in a range of about $1.7 \times 10^5$ Pa to about $3 \times 10^5$ Pa at about −20° C.; and
a storage modulus in a range of about $1.5 \times 10^4$ Pa to about $6 \times 10^4$ Pa at about 25° C.

2. The resin composition of claim 1, wherein, after UV curing, a ratio of the storage modulus at about 25° C. to the storage modulus at about −20° C. is in a range of about 0.05 to about 1.

3. The resin composition of claim 1, wherein, after UV curing, the resin composition has a storage modulus in a range of about $1.5 \times 10^4$ Pa to about $6 \times 10^4$ Pa at about 60° C.

4. The resin composition of claim 3, wherein, after UV curing, a ratio of the storage modulus at about 60° C. to the storage modulus at about −20° C. is in a range of about 0.05 to about 1.

5. The resin composition of claim 1, further comprising an organic solvent,
wherein a content of the organic solvent is less than about 0.5 wt % based on a total weight of the resin composition.

6. The resin composition of claim 1,
wherein a content of the at least one bifunctional (meth)acrylate monomer is less than about 1 wt % based on a total weight of the resin composition.

7. The resin composition of claim 1, further comprising a (meth)acrylate monomer containing a hydroxy group.

* * * * *